United States Patent
Harrold et al.

(10) Patent No.: US 6,184,951 B1
(45) Date of Patent: Feb. 6, 2001

(54) LIQUID CRYSTAL DISPLAY WHEREIN EACH PIXELS OF FIRST LAYER IS OPTICALLY ALIGNED WITH RESPECTIVE GROUP OF PIXELS OF SECOND LAYER

(75) Inventors: Jonathan Harrold, Oxford; Martin David Tillin, Oxfordshire, both of (GB)

(73) Assignee: Sharp Kabushiki Kaisha, Osaka (JP)

( * ) Notice: Under 35 U.S.C. 154(b), the term of this patent shall be extended for 0 days.

(21) Appl. No.: 08/622,759

(22) Filed: Mar. 27, 1996

(30) Foreign Application Priority Data

Mar. 30, 1995 (GB) .................................................. 9506561

(51) Int. Cl.$^7$ ....................... G02F 1/1347; G02F 1/1333; G02F 1/1335

(52) U.S. Cl. ................. 349/74; 349/75; 349/78; 349/86; 349/117

(58) Field of Search ............................... 349/74, 86, 117, 349/77, 75, 78

(56) References Cited

U.S. PATENT DOCUMENTS

| | | | |
|---|---|---|---|
| 4,610,507 | | 9/1986 | Kamamori et al. .................... 350/335 |
| 4,842,379 | * | 6/1989 | Oishi et al. ............................. 349/74 |
| 5,090,794 | * | 2/1992 | Hatano et al. ......................... 359/53 |
| 5,124,818 | | 6/1992 | Conner et al. ......................... 359/53 |
| 5,150,237 | * | 9/1992 | Iimura et al. .......................... 349/75 |
| 5,194,973 | * | 3/1993 | Isogai et al. ........................... 349/74 |
| 5,243,451 | * | 9/1993 | Kanemoto et al. .................... 349/75 |
| 5,264,952 | * | 11/1993 | Fukutani et al. ...................... 349/78 |
| 5,296,952 | | 3/1994 | Takatsu et al. ........................ 359/53 |
| 5,317,431 | * | 5/1994 | Yoshida et al. ....................... 349/78 |
| 5,342,545 | | 8/1994 | Yamada et al. ................. 252/299.01 |
| 5,570,211 | * | 10/1996 | Hanaoka et al. ...................... 349/74 |
| 5,592,314 | * | 1/1997 | Ogasawara et al. .................. 349/74 |

FOREIGN PATENT DOCUMENTS 0430591 6/1991 (EP) .
0509727 10/1992 (EP) .

OTHER PUBLICATIONS

Scheffer et al, "Liquid Crystals—Applications and Uses," vol. 1, pp. 269–270, 1990, 10.3.6.4 Substractive Color STN Displays.

* cited by examiner

*Primary Examiner*—William L. Sikes
*Assistant Examiner*—Tarifur R. Chowdhury
(74) *Attorney, Agent, or Firm*—Renner, Otto, Boisselle & Sklar LLP

(57) ABSTRACT

A color display includes a first layer of pixels, each of which has an independently controllable light attenuation so as to control the display intensity of each display pixel independently. A second layer of pixels is provided in which the color of each pixel can be independently controlled. Thus, each effective display pixel can be controlled, independently of the other pixels, with respect to its intensity and chrominance.

31 Claims, 13 Drawing Sheets

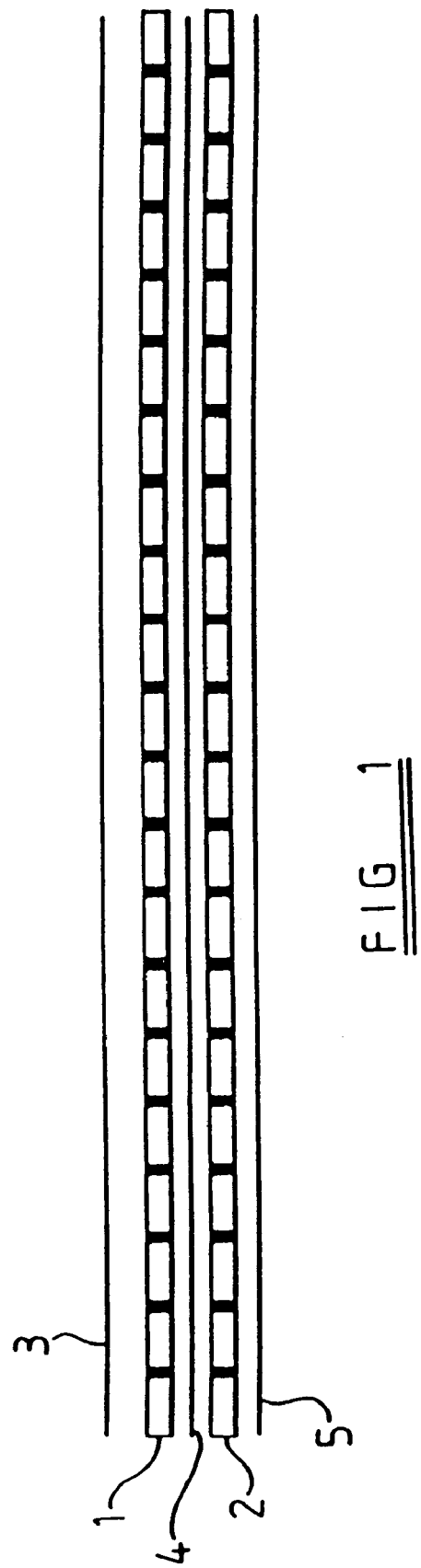

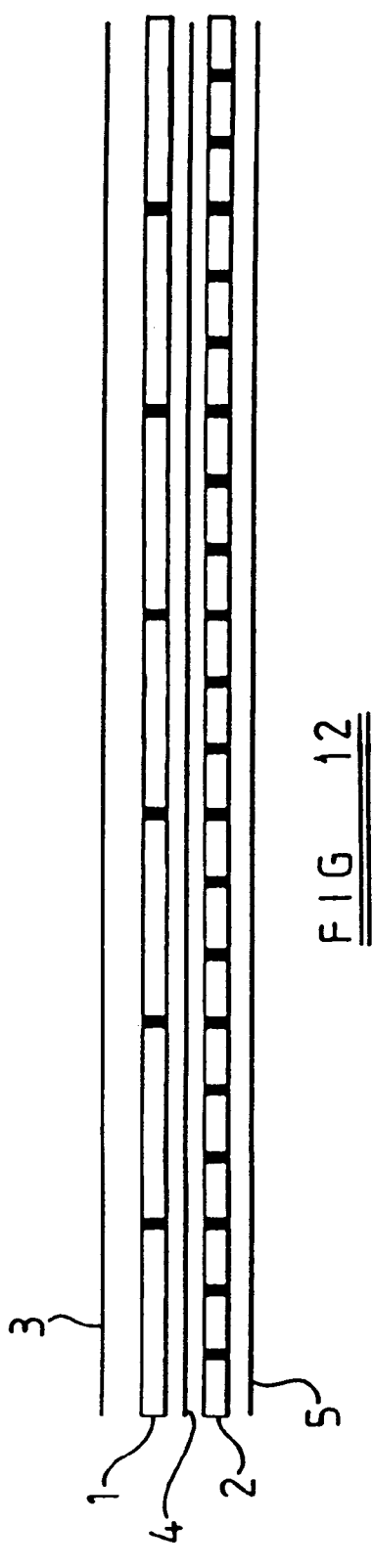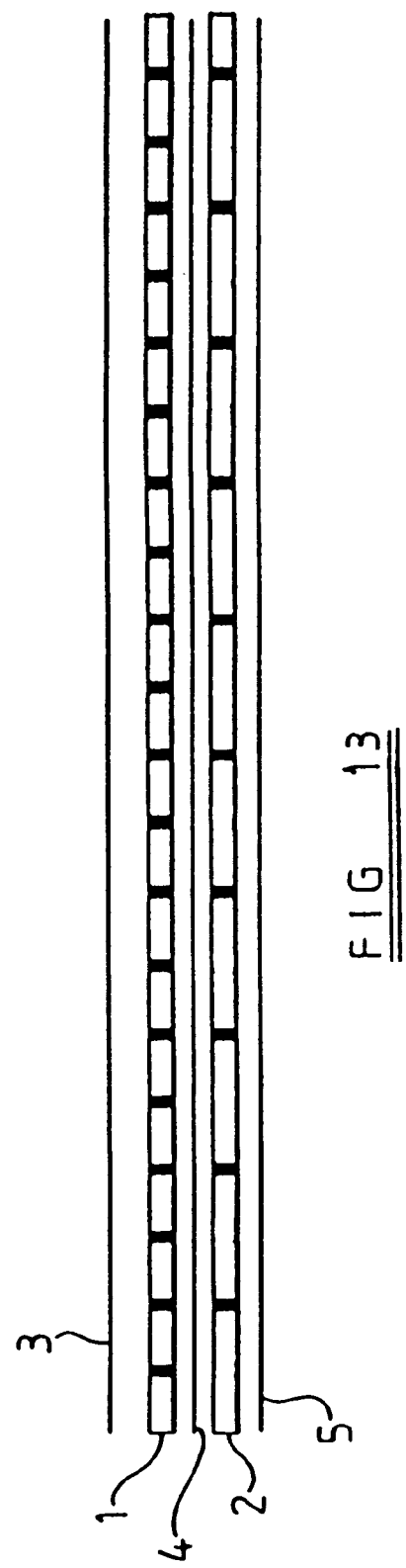

LIQUID CRYSTAL DISPLAY WHEREIN EACH PIXELS OF FIRST LAYER IS OPTICALLY ALIGNED WITH RESPECTIVE GROUP OF PIXELS OF SECOND LAYER

The present invention relates to a display. Such a display may, for instance, be used as a high resolution reflective colour display for "personal digital assistant" (PDA) applications and for high light efficiency projection displays.

A known type of display uses polymer dispersed liquid crystals (PDLCs) which are switchable between a clear and a light scattering state. No polariser is necessary for such displays so that, by placing a 100% absorber beneath them, a good approximation to black print-on-paper contrast and brightness can be produced. The electro-optic response curve of known PDLC materials requires the use of active matrix addressing in order to provide an "XY panel".

Although it is possible to adapt such displays for providing a colour display, the resulting display has disadvantages. For instance, by providing cyan, magenta, and yellow colour absorbers under the PDLC, a maximum absorption of only 33% is obtained. This results in the maximum black level which can be displayed being a relatively bright grey. Using red, green, and blue absorbers under the PDLC gives a 66% maximum absorption resulting in an unsatisfactorily low contrast ratio in reflected light, particularly when backscatter from the PDLC is included.

A further disadvantage of PDLC displays is that the fully clear state is oily realised for on-axis viewing, whereas it is desirable for high contrast to be provided over a substantial viewing angle. This is caused by the anisotropic liquid crystal being dispersed in an isotropic polymer. Although this problem can be largely overcome by dispersing the liquid crystal in a liquid crystal polymer having similar anisotropy, the anisotropies of the materials have to be matched in planes both perpendicular and parallel to the display cell, for instance by initially poling the structure by a high electric field. This adds to the cost and complexity of manufacturing such displays.

EP-A-0509727 discloses a liquid crystal display of the reflection type in which one layer is pixellated and controls light attenuation and another layer comprises three electrically controllable colour, unpixellated colour filters disposed optically in series. Colour images are obtained by time division multiplexing such that each filter can be activated in turn.

U.S. Pat. No. 4,842,379 disclosed image recording apparatus utilising a liquid crystal shutter array. The shutter has a pixellated layer for controlling light attenuation and an electrically controllable, unpixellated birefringent layer for controlling colour. The shutter works in time multiplexed mode to enable different colours to be passed in turn.

The above-described multiplexing systems have the disadvantage of needing a liquid crystal device capable of being addressed and responding at multiple video-frame rate. This is not required in the present invention According to the invention, there is provided a display comprising a first layer of pixels, each of which has an independently controllable light attenuation, and a second layer of pixels, each of which provides an independently controllable colour.

Preferred embodiments of the invention are defined in the other appended claims.

The present invention makes it possible to provide a display having a two layer pixel structure in which the first layer of display pixels controls the light intensity of each image pixel (i.e. the pixel perceived by the viewer) and the second layer of display pixels controls the chrominance of each image pixel. Such a display is capable of providing a good range of colours while improving the resolution by a factor of three compared with known RGB displays in which three display pixels are required for colouring each image pixel. Also, the effective brightness of the display can be increased because each display pixel of the second layer can be made to display the required colour. Such displays may be used as transmissive or reflective displays and an appropriate technologies may be used to embody the two layers so as to provide pixellated intensity control and pixellated chrominance control.

For chrominance control technologies which do not provide the full required colour palette, two or more display pixels of the second layer may be allocated to each image pixel so as to extend the perceived colour palette by visual integration of the colours produced by the two display pixels. Although this reduces the resolution, nevertheless the resolution is still greater than for known RGB displays. Only those parts of the display which are required to display such colours need to be controlled in this way, the remaining parts of the display having a single display pixel in the second layer corresponding to each image pixel.

Alternatively, where lower resolution is required, the display pixels may be made larger. This provides enhanced brightness and contrast compared with known displays and relaxes manufacturing requirements so as to improve manufacturing yield and/or reduce manufacturing cost.

In order to obtain a desired colour in HLS (hue, lightness, saturation) colour space, different components may be provided in different ways in reflective and transmissive embodiments of the display. In transmissive embodiments, hue is defined by the second layer, lightness is defined by the first layer, and saturation is defined by controlling an adjacent pixel to be white or grey. In reflective embodiments, hue is defined by the second layer, lightness is defined by controlling an adjacent pixel to be black or grey, and saturation is defined by the first layer.

The invention will be further described, by way of example, with reference to the accompanying drawings, in which:

FIG. 1 is a cross-sectional view of a display constituting a first embodiment of the invention;

FIG. 12 is a cross-sectional view of a display constituting a sixth embodiment of the invention; and FIG. 13 is a cross-section view of a display constituting a seventh embodiment of the invention.

Figure 2A:
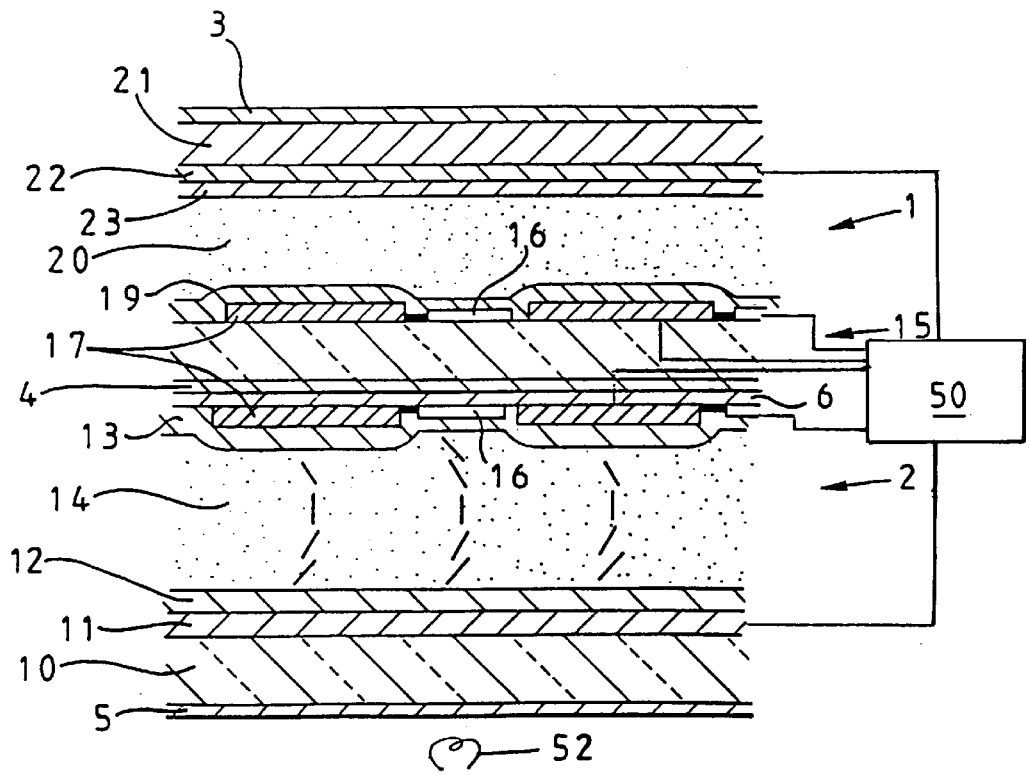
FIG. 2a is a cross-sectional view showing part of the display of FIG. 1 in more detail.

FIG. 1 shows a transmissive display in the form of an XY panel comprising a rectangular array of picture elements which are independently addressable and controllable in XY directions. The display comprises a pixellated variable intensity layer 1 formed by a twisted nematic liquid crystal layer with electrodes defining the XY pixellation. A variable chrominance layer 2 is similarly pixellated so that the pixels of the layers 1 and 2 are optically aligned perpendicular to the display surface and are adjacent to each other so as to reduce cross-talk between non-aligned pixels. The spacing of the layers 1 and 2 is minimised so as to avoid or minimise cross-talk. The variable chrominance layer 2 is embodied by (a) a voltage-tunable reflector so that each pixel of layer 2 is a voltage-tunable colour-selective reflector, or (b) an electrochromic cell, or (c) a variable retardation cell. Such cell (c) may be an electrically controlled birefringence (ECB) cell or a π-cell. In the following description, the chrominance layer 2 is embodied by a π-cell.

The layer 1 is disposed between polarisers 3 and 4 whose polarisations are such that the twisted nematic liquid crystal of the layer 1 has a variable attenuation to light passing through the display. A further polariser 5 cooperates with the layer 2 and the polariser 4 to provide variable retardance to light passing through the display so as to control the chrominance or hue transmitted by each pixel of the layer 2. In the case where the layer 2 is a voltage-tunable reflector, the polariser 5 is omitted.

As is known and, for instance, disclosed in EP-A-0616240 and GB-A-2286056, π-cells exhibit a retardance which is dependent on the electric filed applies across the cell.

FIG. 2a is an enlarged view of part of the display shown in FIG. 1 and illustrates two pixels of the display. The display comprises a first transparent substrate 10 of glass or clear plastic which, in it slower surface as shown in FIG. 2a, carries the polariser 5. The upper surface of the substrate 10 carries a common transparent electrode 11, for instance of indium tin oxide (ITO). The electrode 11 has formed on its upper surface an alignment layer 12. The alignment layer 12 is separated from a further alignment layer 13 by a liquid crystal material 14, for instance of the type known as E7 made by Merck. The alignment layers 12 and 13 have parallel alignment directions pointing in the same direction so as to form the π-cell structure illustrated in the drawing.

The display has a middle plate 15 which acts as a substrate for an active matrix addressing arrangement including thin film transistors 16, pixel electrodes 17, and conductive connections. The thin film transistor circuitry is provided on the upper and lower surfaces of the plate 15 and is interconnected via suitable conductive tracks and connections to the electrodes 17. The pixel electrodes 17 are made of transparent material such as ITO.

In FIG. 2a, the plate 15 is shown as including the polariser 4, and a polariser protection layer 6 is provided between the polariser 4 and the parts 13, 16, and 17. The polariser 4 may be located on the lower surface of the plate 15 as shown in FIG. 2a, or it may be located on the upper surface of the plate 15. In either case, it is disposed optically between the layers 1 and 2.

The plate 15 carries an alignment layer 19 in contact with a twisted nematic liquid crystal 20. A further transparent substrate 21 carries a common transparent electrode 22 and an alignment layer 23 with the liquid crystal 20 being disposed between the alignment layers 19 and 23. The substrate 21 carries the polariser 3 on its upper surface.

The polarisers 4 and 5 are aligned such that their polarising directions are substantially at 45° to the pretilt angles of the molecules of the liquid crystal 14 at the alignment layers 12 and 13 (the alignment directions). The polarising directions of the polarisers 4 and 5 may be parallel or perpendicular to each other.

Figure 2B:
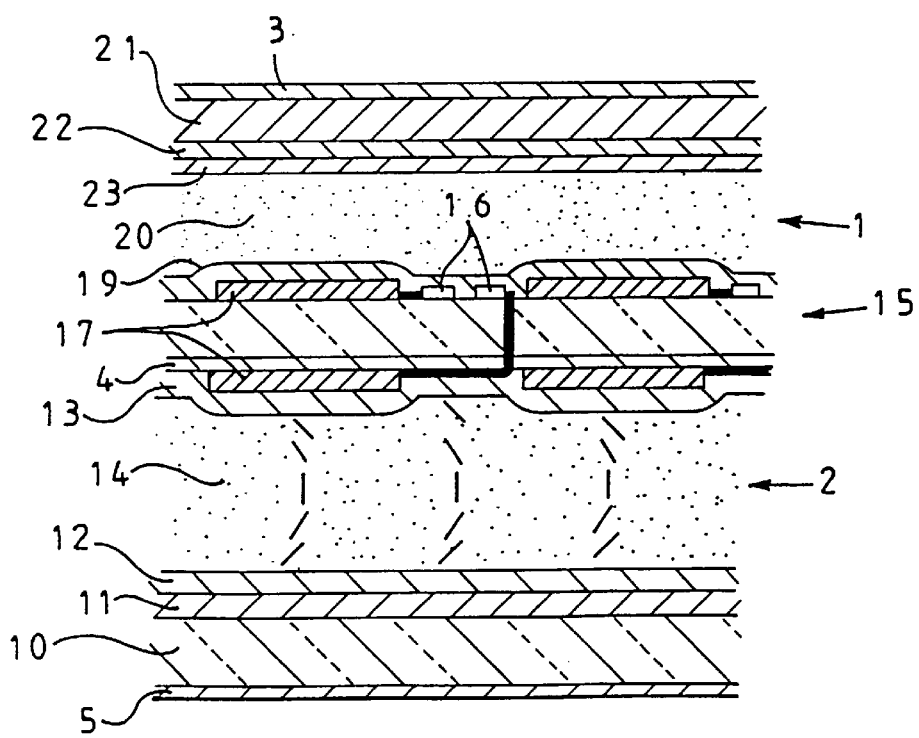
FIGS. 2b and 2c are views similar to FIG. 2a but respectively illustrating two possible modifications.

In an alternative arrangement as shown in FIG. 2b, the polariser protection layer 6 is omitted as it is not required. The transistors 16 are located on only one surface of the plate 15 and control the aligned electrodes 17 by means of conductors which pass through the plate 15 from one side to the other.

Figure 2C:
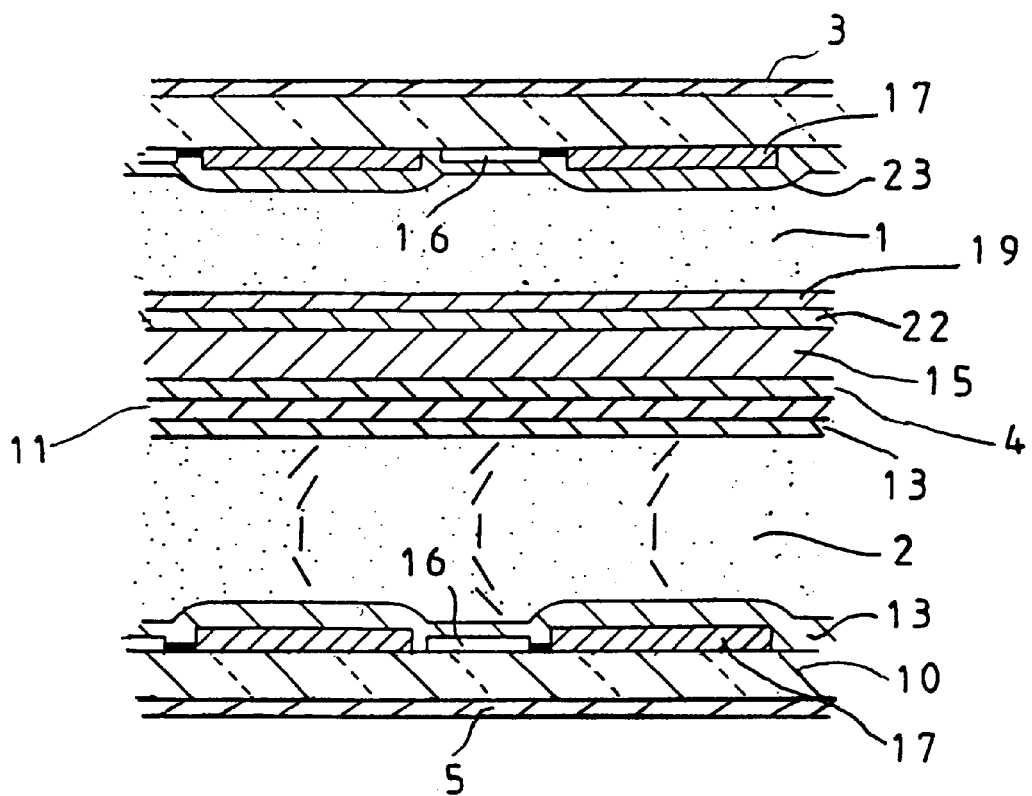

In a further arrangement as shown in FIG. 2c, a respective active matrix addressing system including thin film transistors 16, pixel electrodes 17 and conductive connections is disposed on the inner face of each of the substrates 10 and 21, whilst the other electrodes 11 and 22 are located on opposite sides of the middle plate 15. This enables the internal layer structure defined by middle plate 15, other electrodes 11 and 22, and alignment layers 13 and 19 to be made very thin in order to reduce further, or eliminate, cross-talk between the layers 1 and 2.

In a modification of any of the arrangements of FIGS. 2a to 2c, at least one of the thin film transistor (TFT) active addressing arrangements is replaced by a thin film diode arrangement. In a further modification, the active matrix addressing system for the pixels of one or both of the layers 1 and 2 is replaced by a passive matrix addressing system wherein row electrodes and column electrodes are provided on opposite sides of the layer or the respective layer. The arrangement of FIG. 2c may be employed where at least one of the addressing systems is of the active matrix type.

A driving circuit 50 is provided for the matrix addressing arrangement and electrodes 11 and 22. The display is back lit by light source 52. These are only schematically shown in FIG. 2a.

In use, the pixel electrodes 17 associated with the liquid crystal layer 14 serve to define pixels in the latter, the lateral extent of each pixel being defined by the pixel electrode 17. The voltage across each such pixel enables the optical retardance of the respective portion of the liquid crystal 14 to be varied so that the wavelength at which $m\lambda/2$ retardation (were m is an integer) occurs can be tuned across the visible spectrum and beyond. When the polarising directions of the polarisers 4 and 5 are mutually perpendicular, this results in a transmitted colour which is voltage-tunable. The value of the integer m defines the mode of operation of the π-cell. For instance, when the m=2 mode is used to obtain a variable colour, the same thickness of cell can be operated at a lower order with appropriate drive voltage to produce differently saturated colours.

The variable intensity layer 1 is operated in the conventional manner but shares the polariser 4 with the chrominance layer 2.

By appropriately selecting the thickness of the liquid crystal layer 14 and the drive voltage range for the pixels of the layer 2, the liquid crystal layer 14 is capable of producing a range of relatively saturated colours so that the colour of each pixel of the display is controllable. The presence of the polarisers in the display reduces the overall light throughput efficiency to less than 50%. However, because there are not fixed colour filters as are used in conventional displays, for instance of the RGB type, there is not further reduction in efficiency. Thus, the present display can be up to three times brighter than the known types of RGB displays with the same backlight. The present display can provide the same resolution for two thirds of the number of display pixels required in a conventional RGB display, the display pixels being distributed in the two layers 1 and 2. Thus, the same display resolution can be provided using layers 1 and 2 having one third of the resolution required for RGB displays.

Figure 3:
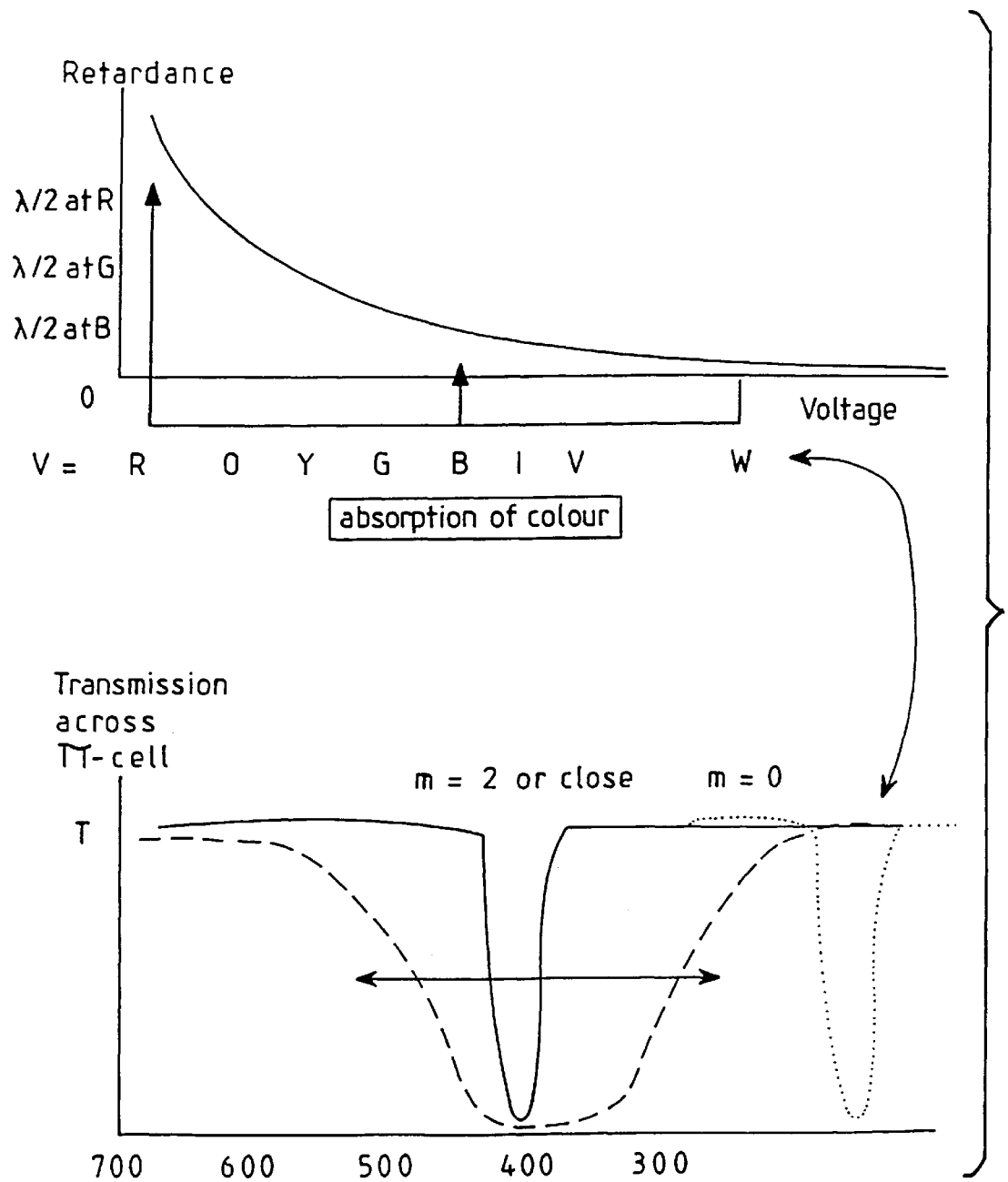
FIG. 3 shows related graphs of retardance against voltage and transmission against wavelength for a π-cell of the display of FIG. 1.

Although it is possible to produce a display which is capable of a large colour range, the colours produced by the display have fixed saturation. This is sufficient for many applications of the display, for instance for displaying text and many graphics. This is illustrated in FIG. 3 which shows two related graphs. The upper graph illustrates retardance against the drive voltage across the π-cell with the voltages corresponding to the colours of the spectrum being indicated by "ROYGBIV". Retardances corresponding to an integer multiple of half a wavelength of red, green, and blue light are indicated on the vertical axis. The lower graph illustrates in continuous lines the transmission of the π-cell against wavelength for a typical drive voltage corresponding to the absorption of the indigo wavelength region for the m=2 mode of operation. The dashed line indicates the transmission characteristic for a different drive voltage corresponding to a different order m of operation of the π-cell.

FIG. 3 also illustrates operation of the π-cell to produce a "white colour". In this case, the retardance of the π-cell approaches zero so that the effective pass band of the π-cell covers the whole of the visible spectrum, when polarisers 4 and 5 are parallel.

Figure 4:
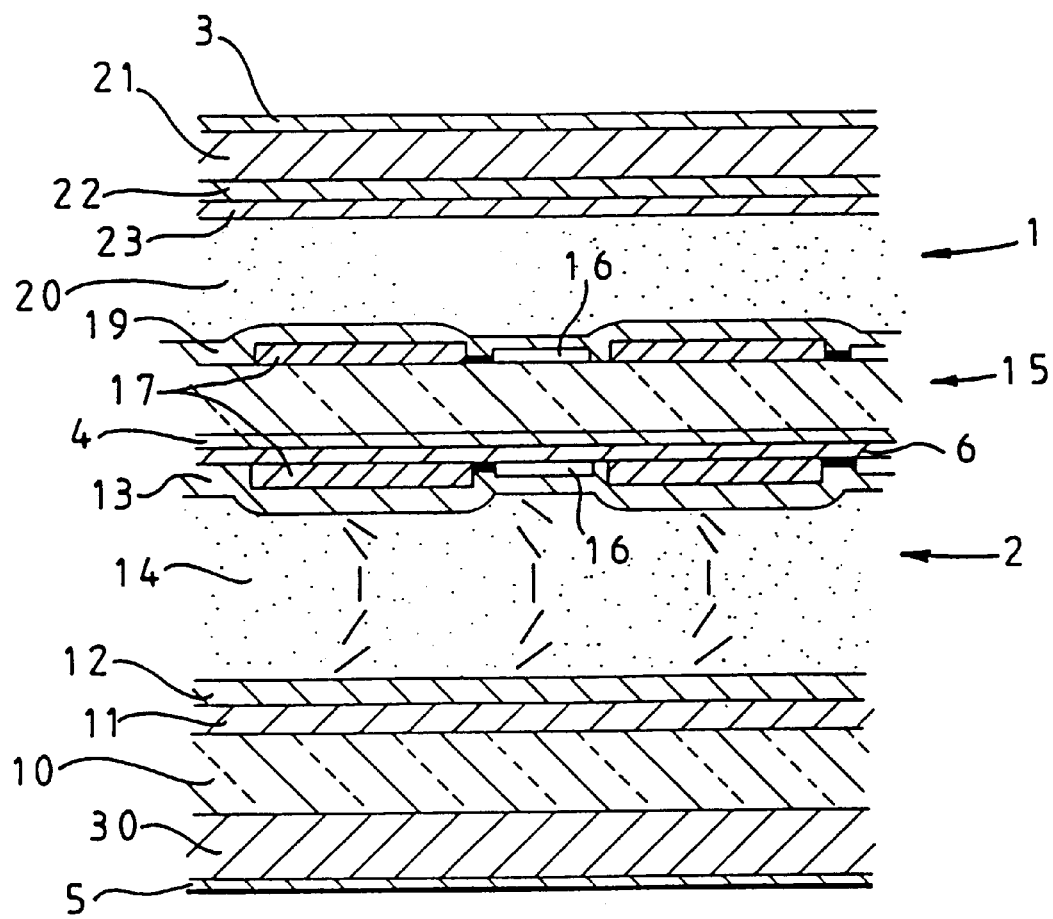
FIG. 4 is a cross-sectional view showing part of a display constituting a second embodiment of the invention.

The range of colours which the display shown in FIGS. 1, 2a, 2b and 2c can provide can be extended by altering the effective saturation of the colours produced by the display. FIG. 4 shows a modified type of display which differs from that shown in FIG. 2a in that a fixed optical retarder 30 is provided within the π-cell between the polariser 5 and the substrate 10. By including such a fixed retarder having the appropriate retardation, the retardation across the π-cell can be reduced to zero for an appropriate voltage drive level. This permits each pixel to produce a good "black" when the polarising directions of the polarisers 4 and 5 are mutually perpendicular or a good "white" when the polarisation directions of the polarisers 4 and 5 are parallel. This provides a high brightness high resolution monochrome or "black and white" mode of operation. However, by combining a white pixel with a fixed saturation colour pixel, it is possible to provide a full colour display. In particular, adjacent colours are "integrated" by the vision of the viewer in the same way that RGB pixels are integrated in known types of displays. By operating the display in this mode, a range of colours sufficient for displaying photographic or video images is provided. By using a suitable display controller, both modes of operation may be present in different parts of the display.

Figure 5:
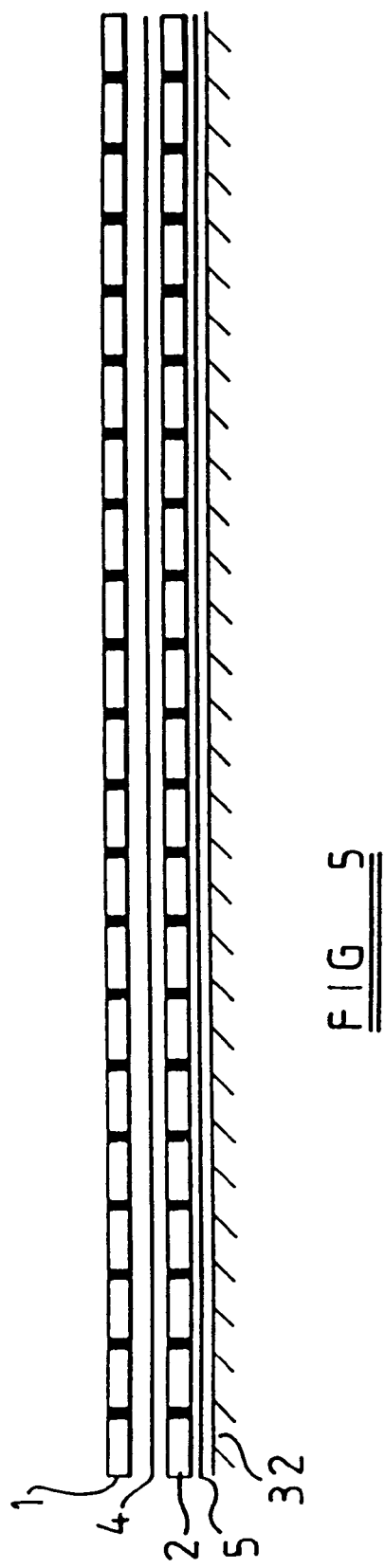
FIG. 5 is a cross-sectional view of a display constituting a third embodiment of the invention.
Figure 6:
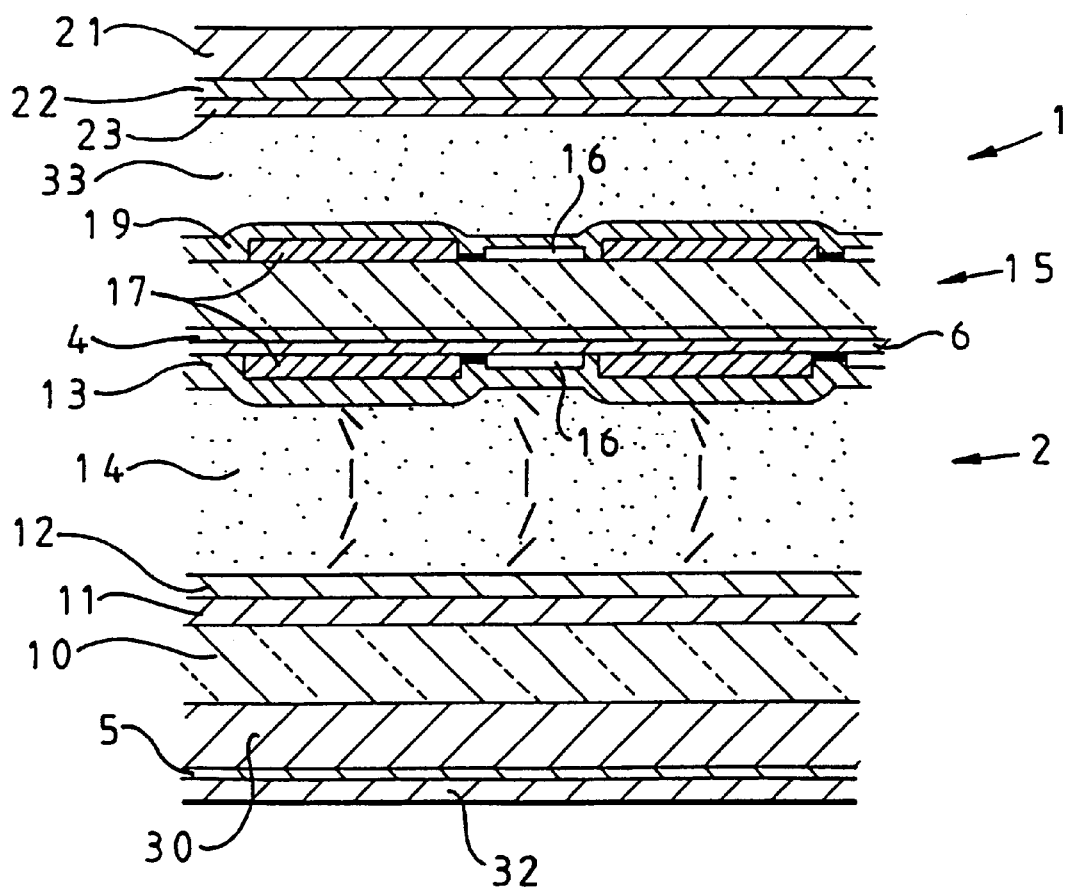
FIG. 6 is a cross-sectional view showing part of the display of FIG. 5 in more detail.

FIG. 5 shows a reflective display which differs from the display shown in FIG. 1 in that a polarisation preserving reflector or mirror 32 is located behind the layer 2 and the polariser 5, whereas the polariser 3 is omitted. This is shown in more detail in FIG. 6. Also, the layer 1 is modified by replacing the twisted nematic liquid crystal 20 with a liquid crystal/polymer composite 33, for instance so as to provide a PDLC type of structure. The fixed retarder 30 is optional but is shown as being present in FIG. 6. The polarisation directions of the polarisers 4 and 5 are mutually perpendicular.

When the PDLC is in its scattering state, it appears "paper white" whereas, when switched to its clear state, the PDLC allows the absorbing π-cell structure to be visible. The variable retardation π-cell uses high quality polarisers so that a good black can be produced at every pixel. The presence of the fixed retarder 30 allows the π-cell to be capable of zero retardance so as to produce a good black. The use of the polarisation preserving reflector 32 allows the polariser 5 to be omitted, which reduces the display contrast but increases the display brightness compared with the presence of the crossed polarisers 4 and 5. As described above for the transmissive display, the appropriate selection of the operating order of the variable retarder cell operating mode allows a range of fixed saturation colours to be produced which includes black, white, red, green, blue, and yellow as illustrated in FIG. 7, which corresponds to FIG. 3.

It is thus possible to provide a high brightness reflective display which can effectively simulate black and a number of coloured pens on white paper. Such an arrangement makes full use of the resolution of the display pixels and permits excellent quality text and graphics to be displayed.

Figure 7:
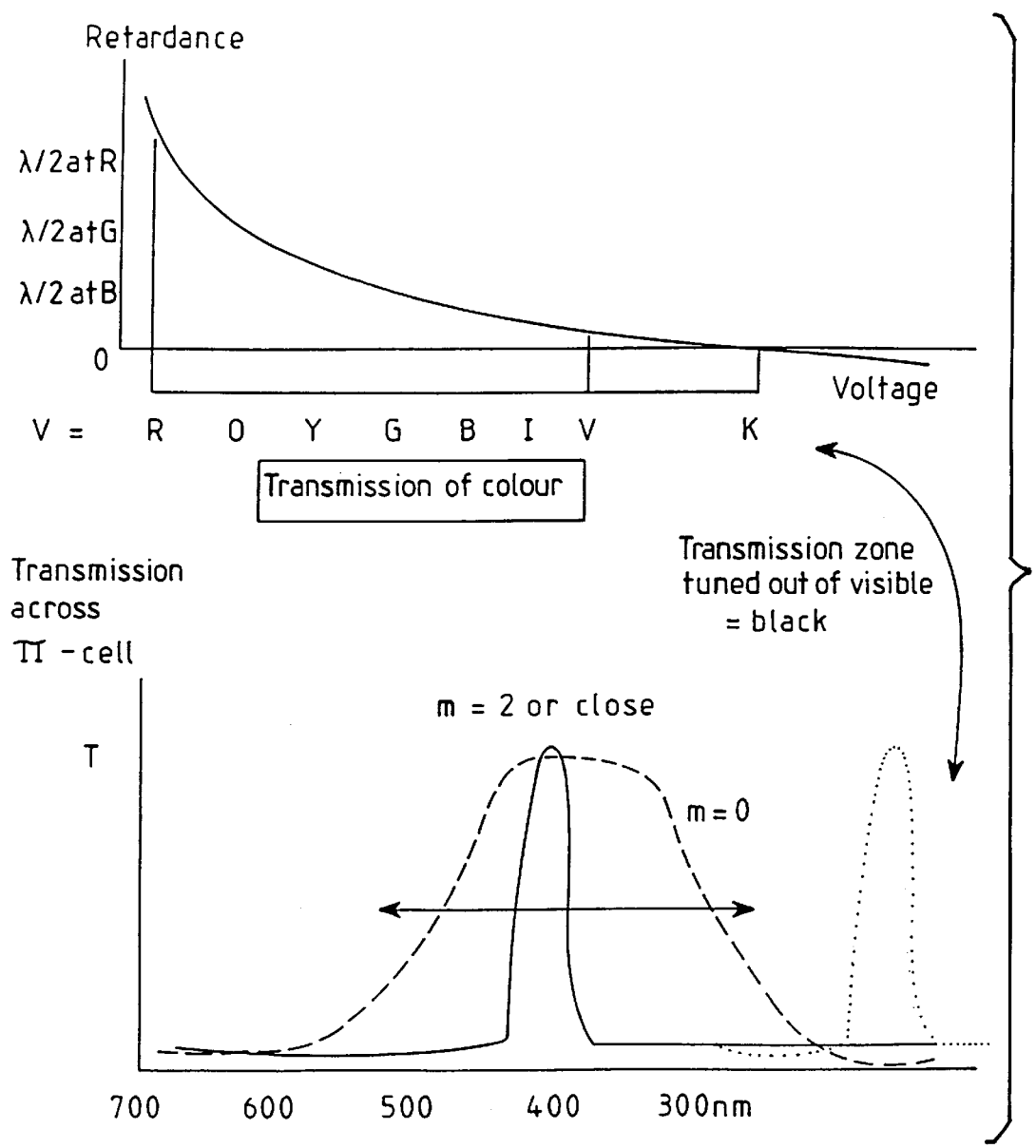
FIG. 7 shows related graphs of retardance against voltage and transmission against wavelength for a π-cell of the display of FIG. 5.

As shown in FIG. 7 and as in the case of the transmissive display described hereinbefore, the display is capable of producing a good range of fixed saturation colours. By combining "grey scale" partially-switched scattering of the PDLC, the underlying colour transmitted by the liquid crystal in layer 2 can be partially mixed with the incoming "white" light so that the saturation of the colours produced by the liquid crystals in layer 2 can be reduced. Again, as described for the transmissive display, by sacrificing spatial resolution in order to mix or integrate the colours of adjacent pixels, a full colour display capable of displaying photographic or bit-map images may be provided. Thus, colour quality can be sacrificed for spatial resolution and vice versa in accordance with the images being displayed over all or part of the display.

Figure 8:
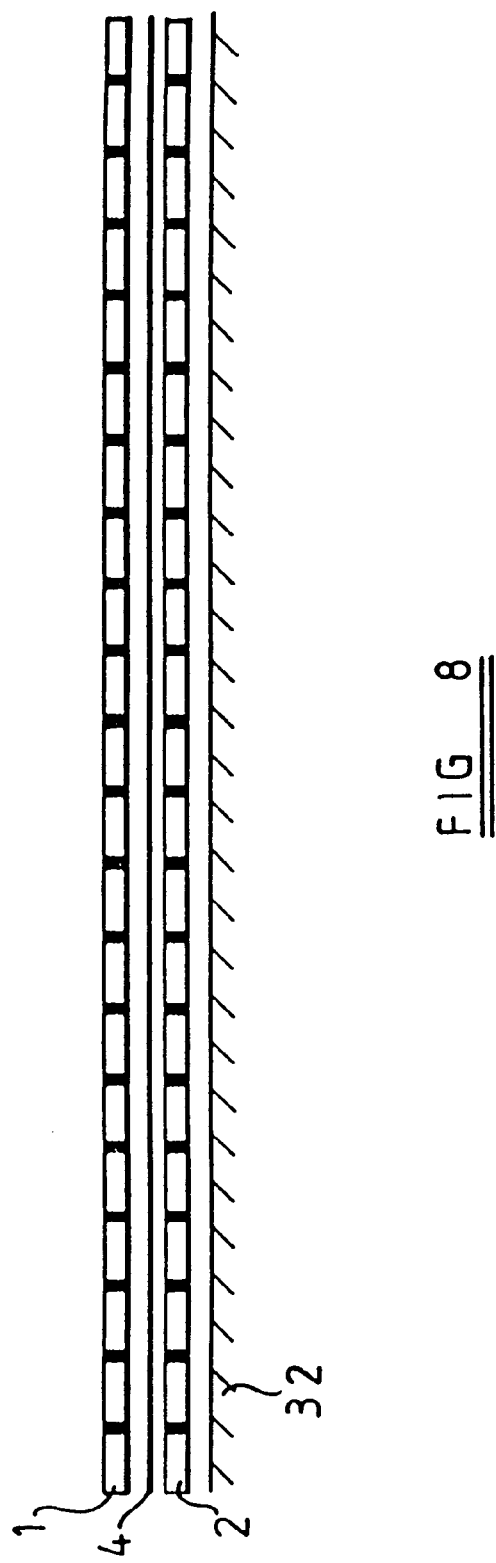
FIG. 8 is a cross-sectional view of a display constituting a fourth embodiment of the invention.
Figure 9:
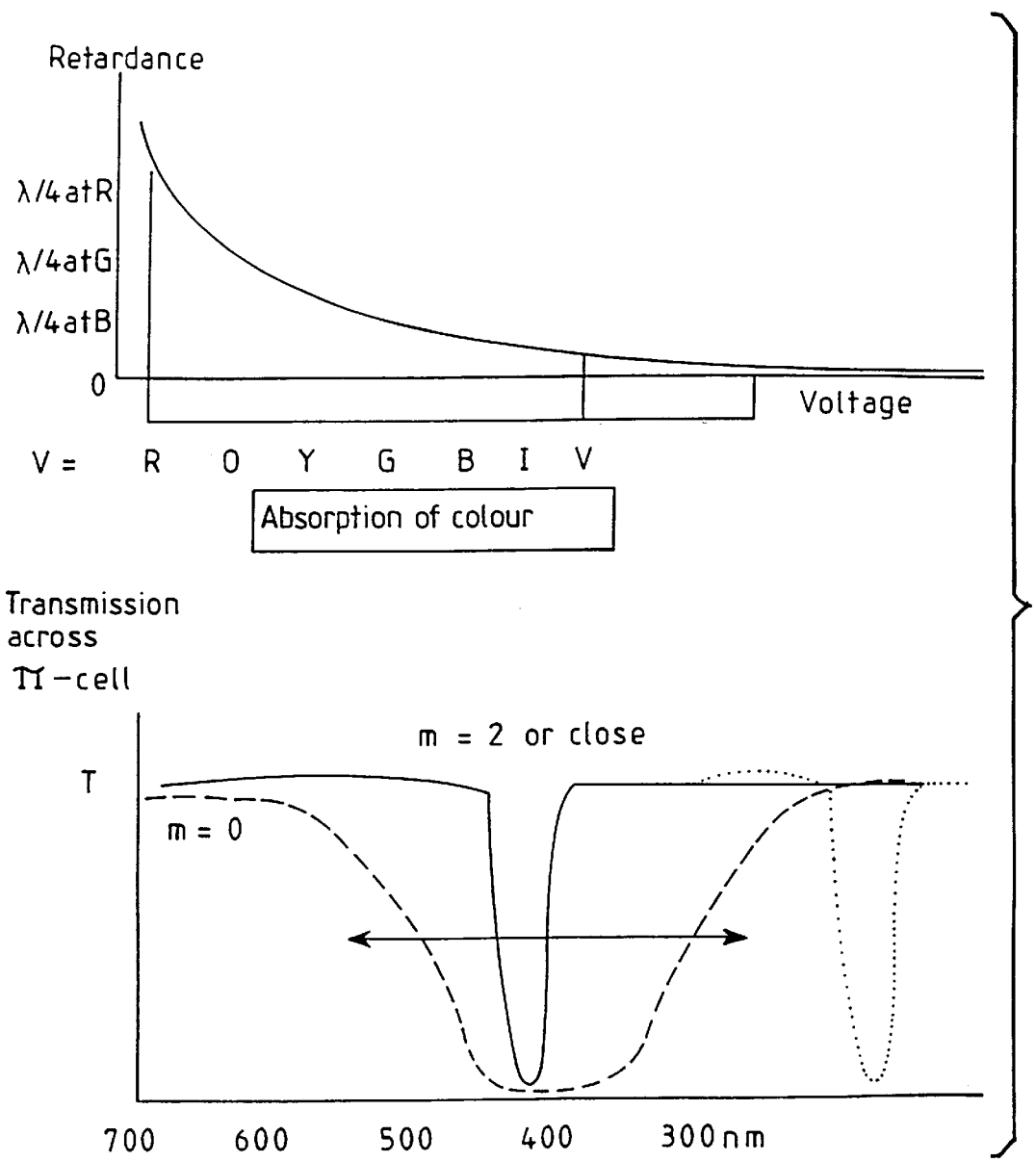
FIG. 9 shows related graphs of retardance against voltage and transmission against wavelength for a π-cell of the display of FIG. 8.

FIGS. 8 and 9 correspond to FIGS. 5 and 7, respectively, and illustrate an alternative reflective mode in which the polariser 5 is omitted. This mode of operation gives higher brightness colours but poorer contrast than the mode of operation illustrated in FIGS. 5 to 7.

Figure 10:
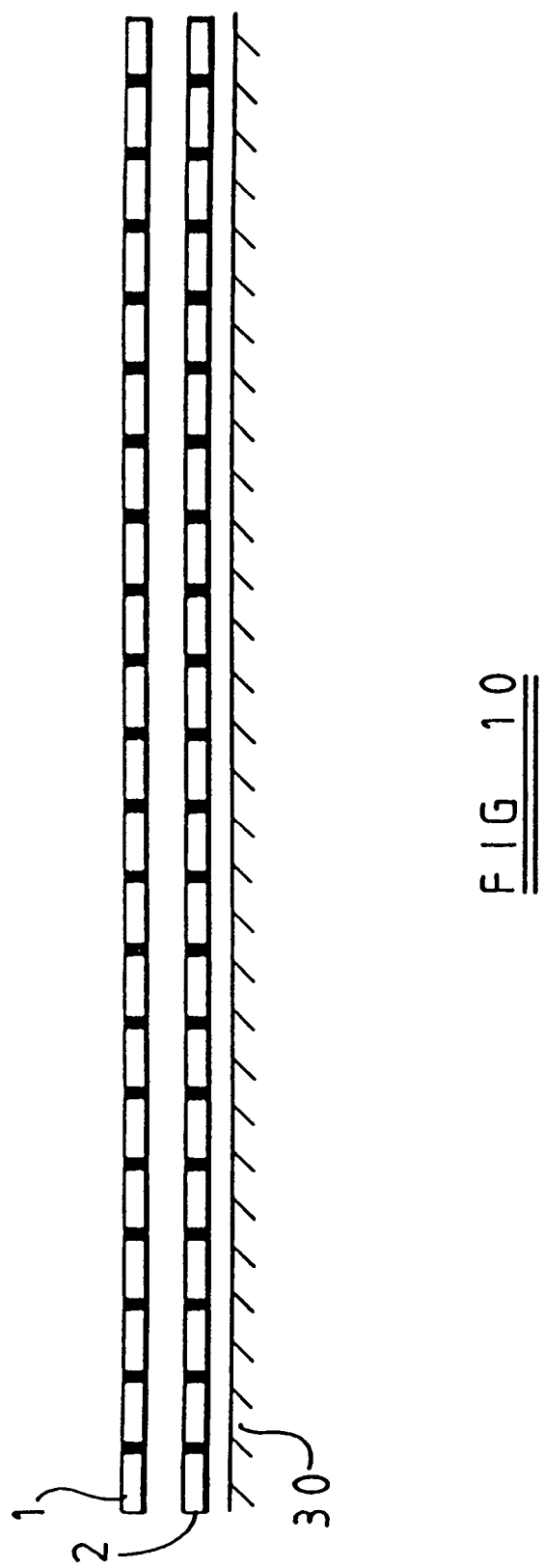
FIG. 10 is a cross-sectional view of a display constituting a fifth embodiment of the invention.
Figure 11:
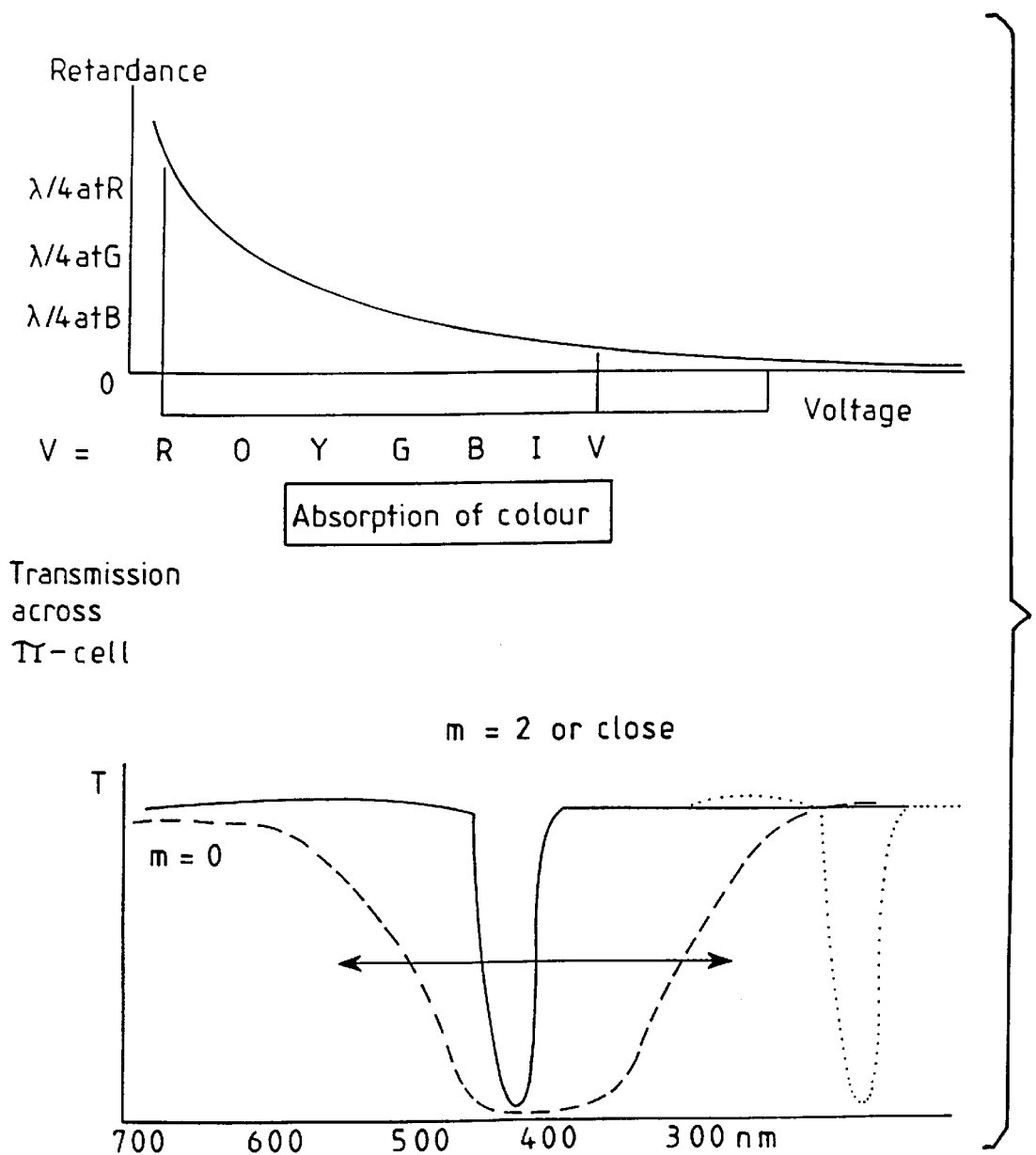
FIG. 11 shows related graphs of retardance against voltage and transmission against wavelength for a π-cell of the display of FIG. 10.

FIGS. 10 and 11 correspond to FIGS. 8 and 9, respectively, but show a modified form of reflective display. In particular, the display of FIG. 10 differs from that shown in FIG. 8 in that all of the polarisers are omitted and the PDLC in the layer 1 is replaced by untwisted guest-host liquid crystals (GHLC). In GHLC, a dichroic dye guest is added to the liquid crystal host and the orientation of the liquid crystal determines the orientation of the guest dye molecules. In the unselected state, the GHLC acts as a polariser for the chrominance layer 2. This gives operation equivalent to the parallel polariser configuration using a polarisation preserving reflector as illustrated in FIG. 8.

In the selected state, the GHLC does not polarise the incoming light and a high brightness (white) reflected light display is provided. Between these two states, a continuous grey scale is available from the GHLC, thus giving a variable saturation to the underlying π-cell hue.

This display has the advantage that a high brightness white can be achieved. In order to ensure a good black state and a high brightness select state, the GHLC should contain a dye with order parameter above 0.6 and preferably above 0.8. Using a GHLC with alignment of the liquid crystal director parallel to the substrate gives the best polarisation of incident light, whereas using a GHLC with a tilted homeotropic alignment and negative dielectric anisotropy liquid crystal gives the brightest display at the expense of polarisation efficiency and hence at the expense of darkness of the black state (display contrast).

In order to increase on-axis brightness of the display at the expense of off-axis viewing angle, Brightness Enhancing film (BEF) of the type manufactured by 3M Company, or a similar optical element, may be used with any of the embodiments described hereinbefore. BEF is particularly effective in the display using PDLC shown in FIG. 8, where it reflects a significant portion of the high-angle forward-scattered light. This also reduces the off-axis haze effect as described hereinbefore.

FIG. 12 shows an alternative embodiment wherein each pixel of the variable intensity layer 1 is optically aligned with a group of, in this case three, pixels of the variable chrominance layer 2 in the illustrated pixel row and, possibly, with one or more pixels in an adjacent row or rows (not shown).

FIG. 13 shows a further alternative embodiment where each pixel of the variable chrominance layer 2 is optically aligned with a group of, in this case two, pixels of the variable intensity layer 1 in the illustrated pixel row and, possibly, with one or more pixels in an adjacent row or rows (not shown).

What is claimed is:

1. A display comprising a first layer of pixels, each of which has an independently controllable light attenuation, and a second layer of pixels, each of which provides an independently controllable color, wherein each of the pixels of the first layer is optically aligned with a respective group of pixels of the second layer.

2. A display as claimed in claim 1, wherein each of the pixels of the second layer is controllable to produce any selected one of a plurality of hues.

3. A display as claimed in claim 1, wherein the pixels of the second layer comprise a plurality of sets, each of which comprises at least two pixels, there being provided means for controlling the pixels of each of the plurality of sets to produce at least two different colors for integration by an observer to perceive a further different color.

4. A display as claimed in claim 1, wherein each of the pixels of the second layer has a variable optical retardation.

5. A display as claimed in claim 4, wherein the pixels of the second layer are defined in a liquid crystal layer.

6. A display as claimed in claim 5, wherein the liquid crystal layer forms a part of a π-cell or an electrically controlled birefringence cell.

7. A display as claimed in claim 4, wherein a fixed optical retarder is provided in series with the second layer.

8. A display as claimed in claim 1, wherein the pixels of the first layer are defined in a liquid crystal layer.

9. A display as claimed in claim 1, further comprising a transparent plate between the first layer and the second layer, wherein the transparent plate acts as a substrate for an addressing system including respective transparent electrodes for the pixels of the first layer and the second layer.

10. A display as claimed in claim 1, further comprising:
a transparent plate between the first layer and the second layer, the transparent plate acting as a substrate for respective transparent electrodes for the first layer and the second layer;
a first substrate disposed on the opposite side of the first layer to the transparent plate;
a second substrate disposed on the opposite side of the second layer to the transparent plate;
an active matrix addressing system including respective pixel electrodes for the pixels of one of the first layer and the second layer, the respective pixel electrodes being disposed on the corresponding substrate; and
a further addressing system including respective electrodes for the other of the first layer and the second layer.

11. A display as claimed in claim 1, herein each of the pixels of the first layer is defined in a guest-host liquid crystal layer and acts, when unselected, as a polarizer for each of the pixels of the optically aligned group of the second layer.

12. A display comprising a first layer of pixels, each of which has an independently controllable variable light attenuation, and a second layer of pixels, each of which provides an independently controllable multi-hue color, wherein the first layer comprises a switchable light scattering material, and
the first layer of pixels and the second layer of pixels are adapted so as to provide single layer pixelated intensity control and single layer pixelated multi-hue chrominance control, respectively.

13. A display as claimed in claim 12, wherein the switchable light scattering material is a liquid crystal/polymer composite material.

14. A display as claimed in claim 12, wherein each of the pixels of the second layer is optically aligned with a respective group of pixels of the first layer.

15. A display as claimed in claim 12, wherein each of the pixels of the first layer is optically aligned with a respective pixel of the second layer.

16. A display as claimed in claim 12, wherein each of the pixels of the second layer has a variable optical retardation.

17. A display as claimed in claim 12, wherein the pixels of the first layer are defined in a liquid crystal layer.

18. A display as claimed in claim 12, further comprising a transparent plate between the first layer and the second layer, wherein the transparent plate acts as a substrate for an addressing system including respective transparent electrodes for the pixels of the first layer and the second layer.

19. A display as claimed in claim 12, further comprising:
a transparent plate between the first layer and the second layer, the transparent plate acting as a substrate for respective transparent electrodes for the first layer and the second layer;
a first substrate disposed on the opposite side of the first layer to the transparent plate;
a second substrate disposed on the opposite side of the second layer to the transparent plate;
an active matrix addressing system including respective pixel electrodes for the pixels of one of the first layer and the second layer, the respective pixel electrodes being disposed on the corresponding substrate; and
a further addressing system including respective electrodes for the other of the first layer and the second layer.

20. A display comprising a first layer of pixels, each of which has an independently controllable light attenuation, and a second layer of pixels, each of which provides an independently controllable color, wherein each of the pixels of the second layer is optically aligned with a respective group of pixels of the first layer.

21. A display as claimed in claim 20, wherein each of the pixels of the second layer is controllable to produce any selected one of a plurality of hues.

22. A display as claimed in claim 20, wherein the pixels of the second layer comprise a plurality of sets, each of which comprises at least two pixels, there being provided means for controlling the pixels of each of the plurality of sets to produce at least different colors for integration by an observer to perceive a further different color.

23. A display as claimed in claim 20, wherein each of the pixels of the second layer has a variable optical retardation.

24. A display as claimed in claim 23, wherein the pixels of the second layer are defined in a liquid crystal layer.

25. A display as claimed in claim 24, wherein the liquid crystal layer forms a part of a π-cell or an electrically controlled birefringence cell.

26. A display as claimed in claim 23, wherein a fixed optical retarder is provided in series with the second layer.

27. A display as claimed in claim 20, wherein the pixels of the first layer are defined in a liquid crystal layer.

28. A display as claimed in claim 20, further comprising a transparent plate between the first layer and the second layer, wherein the transparent plate acts as a substrate for an addressing system including respective transparent electrodes for the pixels of the first layer and the second layer.

29. A display as claimed in claim 20, further comprising:
a transparent plate between the first layer and the second layer, the transparent plate acting as a substrate for respective transparent electrodes for the first layer and the second layer;
a first substrate disposed on the opposite side of the first layer to the transparent plate;
a second substrate disposed on the opposite side of the second layer to the transparent plate;
an active matrix addressing system including respective pixel electrodes for the pixels of one of the first layer and the second layer, the respective pixel electrodes being disposed on the corresponding substrate; and
a further addressing system including respective electrodes for the other of the first layer and the second layer.

30. A display as claimed in claim 20, wherein each of the pixels of the first layer is defined in a guest-host liquid crystal layer and acts, when unselected, as a polarizer for each of the pixels of the optically aligned group of the second layer.

31. A display as claimed in claim 12, wherein the second layer comprises an electrically controllable birefringent (ECB) material.

* * * * *